(12) United States Patent
Arola et al.

(10) Patent No.: US 9,603,347 B2
(45) Date of Patent: Mar. 28, 2017

(54) ADJUSTABLE FISHING ROD

(71) Applicant: Hard and Soft Fishing, Inc., Fort Atkinson, WI (US)

(72) Inventors: Daniel Ray Arola, Albertville, MN (US); Chad Edward Fossum, Andover, MN (US)

(73) Assignee: Hard and Soft Fishing, Inc., Fort Atkinson, WI (US)

( * ) Notice: Subject to any disclaimer, the term of this patent is extended or adjusted under 35 U.S.C. 154(b) by 0 days.

(21) Appl. No.: 14/243,993

(22) Filed: Apr. 3, 2014

(65) Prior Publication Data

US 2014/0298708 A1  Oct. 9, 2014

Related U.S. Application Data

(60) Provisional application No. 61/853,321, filed on Apr. 3, 2013.

(51) Int. Cl.
*A01K 87/02* (2006.01)
*A01K 87/04* (2006.01)

(52) U.S. Cl.
CPC ............ *A01K 87/04* (2013.01); *A01K 87/025* (2013.01)

(58) Field of Classification Search
CPC .... A01K 87/00; A01K 87/002; A01K 87/025; A01K 87/04

USPC .................. 43/24, 18.1 R, 18.1 CT, 18.1 HR
See application file for complete search history.

(56) References Cited

U.S. PATENT DOCUMENTS

| | | | | | |
|---|---|---|---|---|---|
| 2,874,507 | A | * | 2/1959 | Faber | A01K 87/025 43/18.1 CT |
| 3,060,617 | A | * | 10/1962 | Hamp | A01K 87/025 43/18.1 CT |
| 3,445,952 | A | * | 5/1969 | Ferman | A01K 87/025 403/112 |
| 5,175,952 | A | * | 1/1993 | Yamato | A01K 87/025 156/173 |
| 5,372,363 | A | * | 12/1994 | Siddle | F41B 15/025 463/47.7 |
| 5,690,552 | A | * | 11/1997 | Siddle | F41B 15/025 135/75 |
| 6,971,203 | B1 | * | 12/2005 | Foor | A01K 87/025 43/19 |
| 6,973,750 | B1 | * | 12/2005 | Kim | A01K 87/025 43/23 |
| 8,568,242 | B2 | * | 10/2013 | Milligan | F41B 15/025 463/47.7 |
| 2014/0261593 | A1 | * | 9/2014 | Howarth | A45B 9/00 135/74 |

* cited by examiner

*Primary Examiner* — Christopher P Ellis
*Assistant Examiner* — Michael Wang
(74) *Attorney, Agent, or Firm* — Shane Delsman; Godfrey & Kahn, S.C.

(57) ABSTRACT

A fishing rod can be switched between greater rigidity in one configuration to greater flexibility in another configuration. The configuration having greater flexibility is useful when enhanced sensitivity to fish strikes is desired.

15 Claims, 3 Drawing Sheets

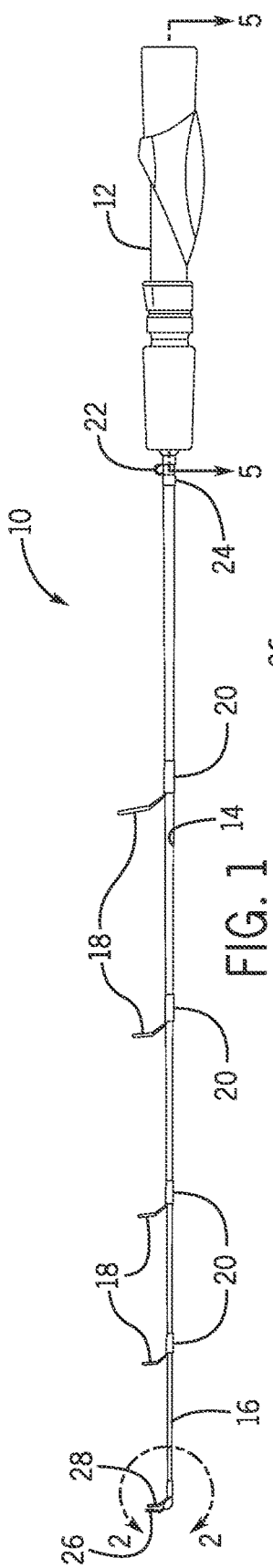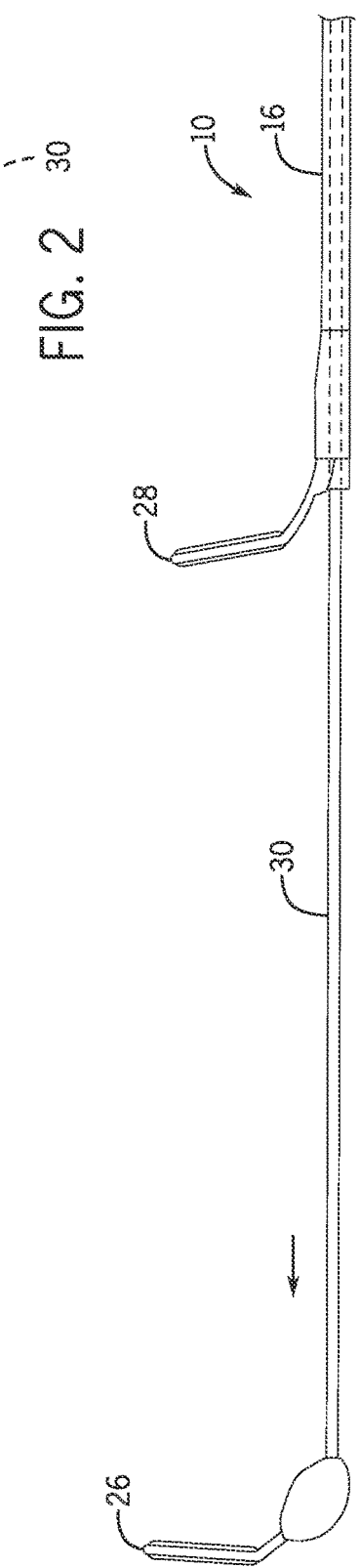

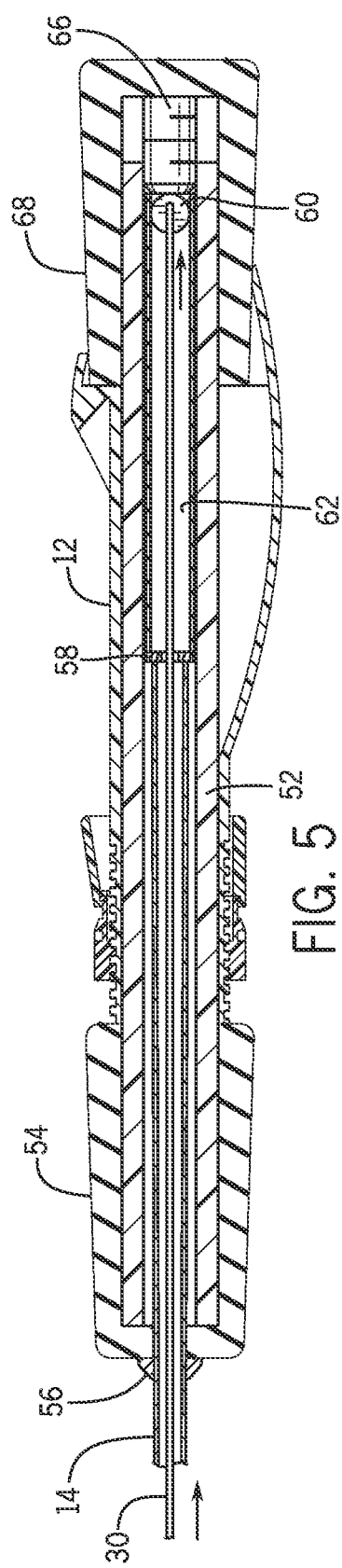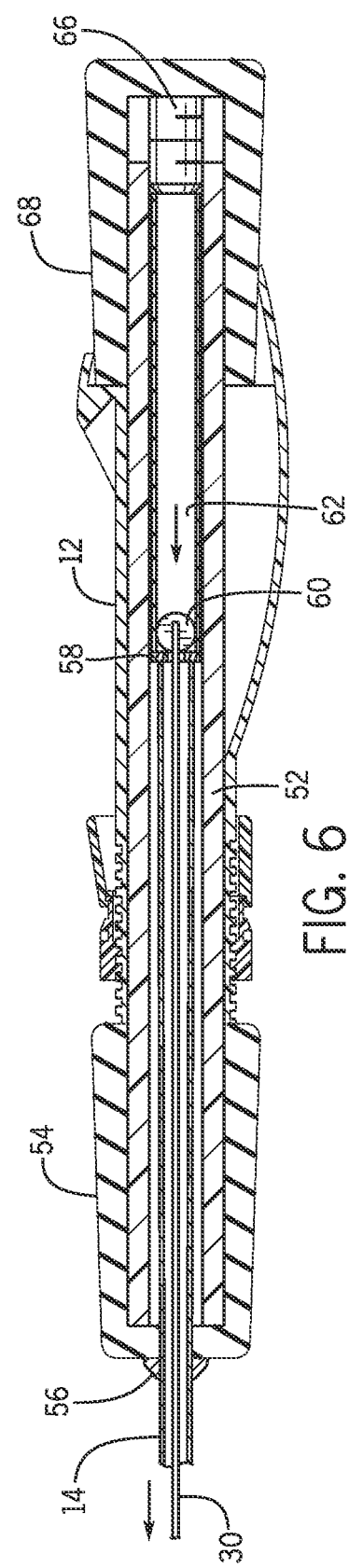

ADJUSTABLE FISHING ROD

CROSS REFERENCE TO RELATED APPLICATIONS

This application claims the benefit of U.S. Provisional Patent Application Ser. No. 61/853,321, filed Apr. 3, 2013, the disclosure of which is hereby incorporated by reference herein in its entirety for all purposes.

FIELD OF THE INVENTION

The present invention relates generally to the field of fishing. More particularly, the present invention relates to the field of fishing rods.

BACKGROUND

There are known many different types of fishing rods. Some types of fishing rods are directed to the type of fishing. For example, a fly fishing rod or fly rod is primarily directed to fly fishing, while an ice fishing rod or ice rod is primarily directed to ice fishing. Other fishing rods are directed to the type of fish that is sought. For example, sea rods are used for catching large game fish such as in the ocean, whereas an ultra-light rod is primarily directed to small fish or for providing more of a challenge with medium sized fish.

When very small fish are sought, for example crappies, sunfish or perch, even an ultra-light rod may not be sensitive enough to detect fish bites or strikes. In order to modify rods to detect such strikes, avid fishers began adding a spring bobber or spring tip to the ends of some rods. However, properly retrofitting an existing rod with a spring bobber or tip can be difficult and frustrating. This problem is compounded if a fisher is going between an application where a spring tip is desired and one where a spring tip is not desired. Buying fishing rods for each application can also be cost prohibitive. Further spring bobbers or tips can be easily lost or misplaced when not in use.

Therefore, a need exists for a spring tip or bobber that can be easily added and removed from a fishing rod, that is cost effective, and that can always be located for use. Embodiments of the following invention solve certain problems in existing fishing rods and spring bobbers or tips and provide some or all of the foregoing benefits.

SUMMARY OF THE INVENTION

One embodiment of the present invention includes a rod with a top portion and a butt portion. To the butt portion is connected a handle. A tip can be adjusted between a first position and a second position. When the tip is in the first position, the rod has a rigidity and when the tip is in the second position, the rod has less rigidity.

Another embodiment of the present invention includes a first hollow rod and a second rod. The first hollow rod has a butt end that is connected to a handle. The second rod is sized to fit within the first hollow rod and is moveable between a first position and a second position. When the second rod is in the second position more of the second rod extends from the first hollow rod than when the second rod is in the first position.

Another embodiment of the present invention includes a hollow rod with a first end and a second end. To the first end of the hollow rod is connected a handle with a cavity. A wire extends through the hollow rod and has a tip end that extends from the second end of the hollow rod. The second end of the wire is connected to a magnet located within a hollow structure. The hollow structure is located in the cavity of the handle. At one end of the hollow structure is located a first ferromagnetic material located and at a second end of the hollow structure a second ferromagnetic material is located. The tip end of the wire may be moved between a collapsed position and an extended position. When the tip end is in the collapsed position, the tip end is adjacent the second end of the hollow rod and the magnet is adjacent and held by magnetic force to the first ferromagnetic material such that the tip end is held in the collapsed position. When the tip end is in the extended position, the tip end is away from the second end of the hollow rod such that the fishing rod is more flexible than when the tip end is in the collapsed position and the magnet is adjacent and held by magnetic force to the second ferromagnetic material such that the tip end is held in the extended position.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 1 is side view of one embodiment of a fishing rod in accordance with the invention;

FIG. 2 is a detail view of the end of the fishing rod of FIG. 1 from the line 2-2 shown with the spring tip collapsed;

FIG. 3 is a detail view of the end of the fishing rod of FIG. 1 from the line 2-2 shown with the spring tip extended;

FIG. 5 is a side cross-section of the fishing rod handle of FIG. 1 taken along the line 5-5 in FIG. 1 with the spring tip collapsed; and FIG. 6 is a side cross-section of the fishing rod handle of FIG. 1 taken along the line 5-5 in FIG. 1 with the spring tip extended.

DETAILED DESCRIPTION

Figure 4:
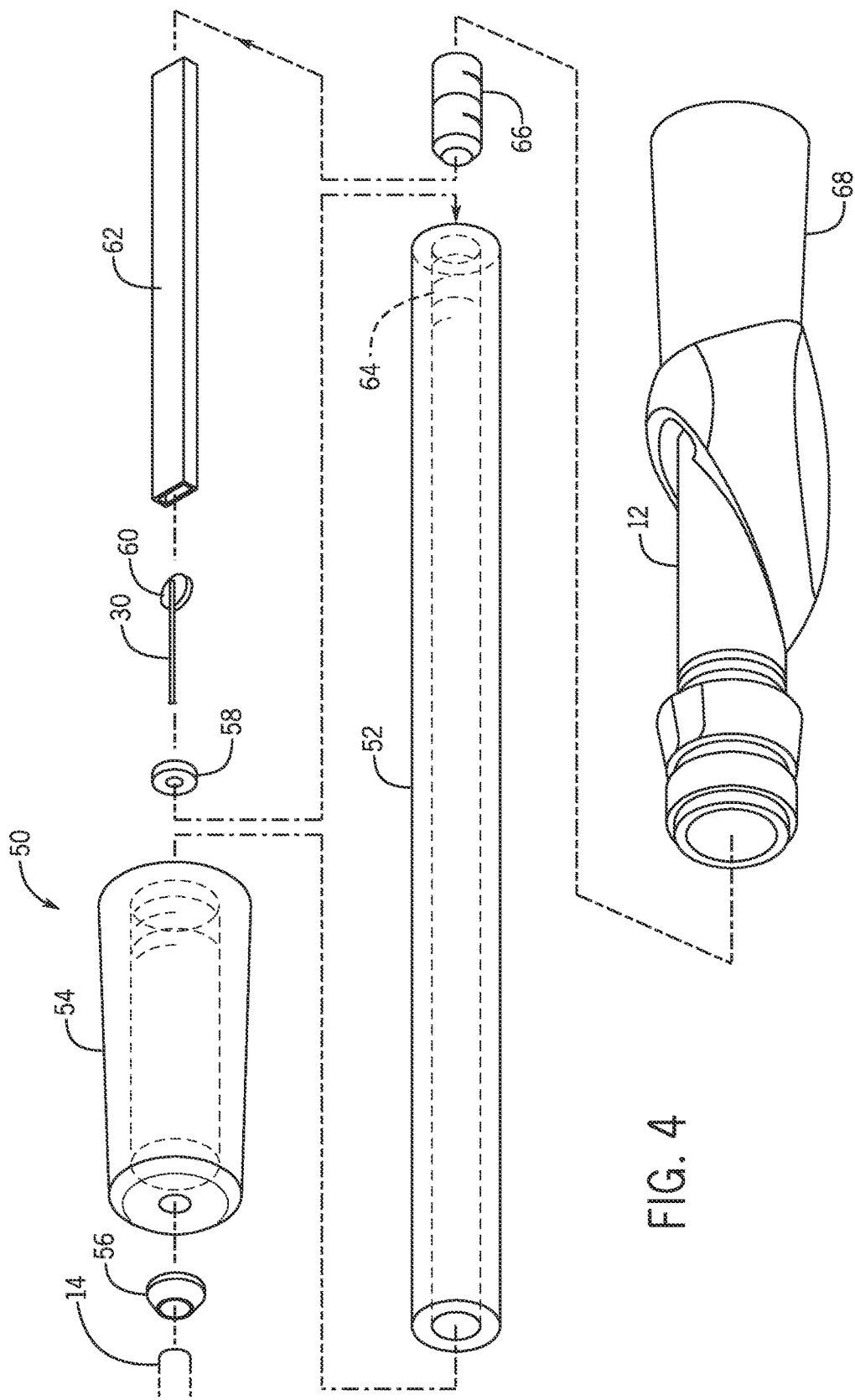
FIG. 4 is an exploded view of the rod of FIG. 1.

A fishing rod in accordance with the present invention provides greater rigidity in one configuration and a fishing rod with greater flexibility in another configuration. The fishing rod could also provide incremental flexibility in relation to incremental arrangements.

As shown in FIGS. 1-3, a fishing rod 10 is disclosed with a handle 12, a butt portion 14 and a top portion 16. On the butt portion 14 of the fishing rod are a number of line guides 18 that are held on to the rod 10 by windings 20 as is conventional in the art. At the end of the butt portion 14 adjacent the handle 12 is a hook keeper 22 that is attached to the rod 10 by a winding 24 as is conventional in the art. At the far end of the top portion 16 of the rod 10 are a first tip 26 and a second tip 28. Although the above described fishing rod, less the multiple tips, is a common configuration, others are known, the use of which would not defeat the spirit of the invention.

As seen more clearly in FIG. 3, when it is desired to have a fishing rod with a spring bobber or tip, for example, when fishing for crappie, the first tip 26 can be extended out of the rod 10 by a second rod or wire 30 that is slideably contained within a hollow of the rod. In one embodiment described below, the first tip 26 can be incrementally extended based upon the desired rod sensitivity.

As seen more clearly in FIG. 2, when it is desired to have a fishing rod with more rigidity, for example when fishing for medium sized fish, the first tip 26 can be collapsed into the rod 10 such that substantially the entire wire 30 is slideably contained within the rod. To allow the first tip 26 to be moved between a collapsed and an extended position, the first tip 26 is connected to one end of the wire 30.

To provide greater convenience and stability, the first tip 26 can be held in select positions depending on the amount of rigidity or flexibility desired. In the embodiment shown in FIG. 3, the first tip 26 is movable between a first position and a second position. For example, the first tip 26 can be held in the fully extended position, such as seen in FIG. 3, the fully collapsed position, such as seen in FIG. 2, or any intermediate position there between.

In the embodiment shown in FIG. 4, the first tip 26 is held in position or releasably retained by a retention means 50. A hollow member 52, such as plastic piping, is inserted into a hollow top portion 54 of the handle which can be made from cork or any other suitable material. The butt portion 14 of the rod adjacent the handle is inserted into a winding check 56, the hollow top portion 54 of the handle and then the hollow member 52, where the butt portion is attached to the hallow member such as by gluing, threading, bonding, welding etc. Into the other end of the hollow member 52 is inserted a first attracting member 58 which can be made from a ferrous or ferromagnetic material. Alternatively, the attracting member 58 could be outside the hollow member 52 such as inside the hollow top portion 54 of the handle. In the embodiment seen in FIG. 4, the attracting member 58 is a metal washer.

The wire 30 is then inserted through the interior hollow portion of the top portion 16 and butt portion 14 until the internal end emerges from the hollow member 52. The wire 30 can be made from NiTinol spring wire or other suitable material. A magnet 60 is attached to the internal end of the wire 30 emerging from the hollow member 52. The magnet 60 is then inserted into a hollow structure or housing 62 such as a hollow rectangular brass bar or plastic injection molding, although the structure holding the magnet 60 could be of any suitable material. The hollow interior portion of the housing 62 is preferably sized just large enough for the magnet 60 attached to the wire 30 to freely slide therein. The housing 62 is then inserted into the hollow member 52.

The hollow interior of the hollow member 52 is preferably sized just large enough for the housing 62 to fit inside. The hollow member 52 is then sealed at the butt end 64 opposite the hollow top portion 54 such that the end is capable of attracting a magnet. In the embodiment seen in FIG. 4, the hollow member 52 is threaded at the butt end 64 and a set screw 66 is threaded therein. The set screw 66 can be made from a ferrous material or a material, such as metal, that can otherwise attract the magnet 60 such that it is a second magnetic material. Alternatively, another metal washer could be inserted before the hollow member 52 is sealed. The hollow member 52 is then inserted into the hollow handle butt 68 and retained such as by threading the handle butt 68 to the hollow top portion 54 of the handle, or by gluing, bonding, welding, etc. Thus, as seen in the embodiment of FIG. 4, the retention means 50 is held within a cavity of the handle 12 of the rod 10.

As seen in FIG. 5, when the rod 10 is in its collapsed configuration, the wire 30 and magnet 60 are fully extended into the housing 62. In the collapsed configuration, the magnet 60 is proximate to the set screw 66. Because the set screw 66 is made from a ferrous material, the magnet 60 is attracted to and held in position by the magnetic force with the set screw 66. Thus, the first tip 26 is held in its collapsed configuration.

As seen in FIG. 6, when the rod 10 is in its extend configuration, the wire 30 and magnet 60 are almost withdrawn out of the housing 62. In the extend configuration, the magnet 60 is proximate to the washer 58. Because the washer 58 is made from a ferrous material, the magnet 60 is held in position by the washer 58. Thus, the first tip 26 is held in its extended configuration.

In an alternative embodiment, the first tip 26 can be incrementally extended beyond the second tip 28. Such incremental positioning of the first tip 26 allows an angler to select a precise sensitivity for a particular fishing application and/or the jig, bait or lure used. One way to provide such an incremental multi-purpose fishing rod is to position additional ferrous or ferromagnetic materials along the housing 62. Thus as the magnet is moved within the housing 62 by the first tip 26 via the wire 30, the magnet will be attracted to each of the additional ferrous or ferromagnetic materials at a select position thus providing incremental positions for the first tip 26. Alternatively, the additional ferrous or ferromagnetic materials could be integrated in the housing 62 or the hollow member 52 at the desired locations.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. For example, other materials may be used for the components of the retention means or other configurations without departing from the spirit of the invention. Such components could include using a threaded engagement or a friction fit rather than a magnet or the magnet and the ferrous or ferromagnetic members 58, 66 could be switched. For example, the magnet 60 shown in FIGS. 4-6, would be replaced with a ferrous or ferromagnetic member and the washer 58 and set screw 66 would be magnetic. In this embodiment, the magnets would be stationary and the ferrous or ferromagnetic member would move. Further, the retention means could even be in retained with the tip or butt of the rod.

What is claimed is:

1. A fishing rod comprising:
   a first rod portion with a top portion and a butt portion;
   a second rod portion connected to a tip; and
   a handle connected to the butt portion;
   a magnet located in the handle;
   wherein the tip can be adjusted between a first position and a second position;
   wherein the first rod portion has more rigidity than the second rod portion;
   wherein the magnet is capable of releasably retaining the tip in the first position when the tip is in the first position and used for fishing and releasably retaining the tip in the second position when the tip is in the second position and used for fishing;
   wherein when the tip is in the first position, the fishing rod has a rigidity and when the tip is in the second position, the fishing rod has less rigidity; and wherein the tip can be selectively moved between the first position and second position based upon the rigidity desired to detect fish strikes.

2. The fishing rod of claim 1, wherein when the tip is in the second position, the tip is extended from the top portion.

3. The fishing rod of claim 1, wherein the second rod portion includes a wire with a first end;
wherein the tip is connected to the first end of the wire; and
wherein the rod has a hollow interior and the wire runs through the hollow interior.

4. The fishing rod of claim 3, wherein the handle has a cavity and the wire has a second end that is attached to a magnet positioned in the cavity.

5. The fishing rod of claim 4, further comprising:
a housing positioned inside the cavity;
a first ferrous material located at one end of the housing; and
a second ferrous material located at another end of the housing;
wherein the magnet is contained within the housing and when the tip is in the first position, the magnet is proximate and attracted to the first ferrous material such that the tip is retained in the first position and when the tip is in the second position, the magnet is proximate and attracted to the second ferrous material such that the tip is retained in the second position.

6. A fishing rod comprising:
a hollow rod with a first end and a second end made from a first material:
a handle connected to the first end of the hollow rod and having a cavity;
a wire made from a second material that extends through the hollow rod with a tip end extending from the second end of the hollow rod;
a hollow structure located within the cavity;
a first ferromagnetic material located at one end of the hollow structure;
a second ferromagnetic material located at a second end of the hollow structure;
wherein the hollow rod has a greater rigidity than the wire;
wherein the first material is more rigid than the second material;
wherein a second end of the wire is connected to a magnet located within the hollow structure;
wherein the tip end of the wire may be moved between a collapsed position and an extended position;
wherein the fishing rod may be used for fishing when the tip end is in any one of the collapsed position, extended position and any position between the collapsed position and extended position;
wherein when the tip end is in the collapsed position:
the tip end is adjacent the second end of the hollow rod; and
the magnet is adjacent and held by magnetic force to the first ferromagnetic material such that the tip end is held in the collapsed position;
wherein when the tip end is in the extended position:
the tip end is away from the second end of the hollow rod such that the fishing rod is more flexible than when the tip end is in the collapsed position; and the magnet is adjacent and held by magnetic force the second ferromagnetic material such that the tip end is held in the extended position.

7. The fishing rod of claim 6, further comprising a hollow member;
wherein the first end of the hollow rod is secured to a top end of the hollow structure; and
wherein the hollow structure, and first and second ferromagnetic materials are secured within the handle.

8. The fishing rod of claim 7, wherein the first ferromagnetic material is a set screw that is threaded into a butt end of the hollow member.

9. The fishing rod of claim 7, wherein the handle is formed from a top portion and a butt portion and wherein the top end of the hollow member at least partially fits within the top portion of the handle and the butt end of the hollow member at least partially fits within the butt portion of the handle.

10. A fishing rod comprising:
a handle;
a first hollow rod with a butt end connected to the handle;
a second rod sized to fit within the first hollow rod and moveable between a first position and a second position;
wherein the first hollow rod has a greater rigidity than the second rod;
wherein the fishing rod may be used for fishing when the tip end is in any one of the first position and second position;
wherein when the second rod is in the second position more of the second rod extends from the first hollow rod than when the second rod is in the first position;
wherein when the second rod is in the first position, a tip of the second rod is adjacent a tip of the first rod; and
wherein the second rod is more flexible than the first hollow rod such that when the second rod is in the second position the fishing rod is more sensitive to fish strikes than when the second rod is in the first position.

11. The fishing rod of claim 10, wherein the first hollow rod has a plurality of line guides;
wherein one of the plurality of line guides is adjacent an end of the first hollow rod opposite the butt end; and
wherein the second rod has a line guide at an end of the second rod extending from the first hollow rod.

12. The fishing rod of claim 11, wherein when the second rod is in the first position, the one of the plurality of line guides adjacent the end of the first hollow rod opposite the butt end is proximate to the line guide at the end of the second rod extending from the first hollow rod.

13. The fishing rod of claim 12, wherein when the second rod is in the second position, the one of the plurality of line guides adjacent the end of the first hollow rod opposite the butt end is distant from the line guide at the end of the second rod extending from the first hollow rod.

14. The fishing rod of claim 10, wherein the second rod is held by a magnet in the first position when the second rod is in the first position and held by a magnet in the second position when the second rod is in the second position.

15. The fishing rod of claim 14, wherein when the second rod is in the first position, the magnet is attracted to a first metal member and when the second rod is in the second position, the magnet is attracted to a second metal member.

* * * * *